United States Patent
Gilhodes et al.

(10) Patent No.: US 11,776,115 B2
(45) Date of Patent: Oct. 3, 2023

(54) SYSTEM AND METHOD FOR ESTIMATING A QUANTITY OF INTEREST BASED ON AN IMAGE OF A HISTOLOGICAL SECTION

(71) Applicant: Biocellvia, Marseilles (FR)

(72) Inventors: Jean-Claude Gilhodes, Marseilles (FR); Yvon Julé, Marseilles (FR); Tomi Florent, Marseilles (FR)

(73) Assignee: BIOCELLVIA, Marseilles (FR)

( * ) Notice: Subject to any disclaimer, the term of this patent is extended or adjusted under 35 U.S.C. 154(b) by 66 days.

(21) Appl. No.: 16/251,730

(22) Filed: Jan. 18, 2019

(65) Prior Publication Data

US 2019/0228260 A1 Jul. 25, 2019

Related U.S. Application Data

(60) Provisional application No. 62/619,447, filed on Jan. 19, 2018.

(51) Int. Cl.
*G06T 7/00* (2017.01)
*G06T 7/136* (2017.01)
(Continued)

(52) U.S. Cl.
CPC .......... *G06T 7/0012* (2013.01); *G06F 18/211* (2023.01); *G06F 18/2431* (2023.01);
(Continued)

(58) Field of Classification Search
CPC combination set(s) only.
See application file for complete search history.

(56) References Cited

U.S. PATENT DOCUMENTS

2004/0101176 A1* 5/2004 Mendonca ............ G06T 7/0012
382/199
2006/0127880 A1* 6/2006 Harris ................ G06K 9/00127
435/4
(Continued)

FOREIGN PATENT DOCUMENTS

JP 2004174254 * 6/2004 ............... A61B 6/03

OTHER PUBLICATIONS

Ashcroft, et al., "Simple method of estimating severity of pulmonary fibrosis on a numerical scale", J Clin Pathol, 1988, pp. 467-470, vol. 41.
(Continued)

*Primary Examiner* — Zhiyu Lu
(74) *Attorney, Agent, or Firm* — BUCHANAN INGERSOLL & ROONEY PC (57) ABSTRACT

A method for determining a quantity of interest related to the density of organic tissue starts with a digital representation of a histological image of the tissue. The digital representation is converted to a binary image, to discriminate pixels that represent tissue of interest in the image. A box filter is applied to values of the pixels of interest to obtain a tissue density value for each pixel of interest. A quantity of interest is computed, based upon the tissue density values for the pixels of interest. A tangible representation of the computed quantity of interest, such as a numerical value, a graph, or a color representation, is displayed or otherwise presented via an interface.

16 Claims, 6 Drawing Sheets
(2 of 6 Drawing Sheet(s) Filed in Color)

(51) Int. Cl.
  *G06T 7/13*    (2017.01)
  *G06T 11/00*   (2006.01)
  *G06T 7/62*    (2017.01)
  *G06V 10/50*   (2022.01)
  *G06V 20/69*   (2022.01)
  *G06F 18/211*  (2023.01)
  *G06F 18/2431* (2023.01)

(52) U.S. Cl.
  CPC .............. *G06T 7/13* (2017.01); *G06T 7/136* (2017.01); *G06T 7/62* (2017.01); *G06T 11/001* (2013.01); *G06V 10/50* (2022.01); *G06V 20/695* (2022.01); *G06T 2207/20072* (2013.01); *G06T 2207/30061* (2013.01); *G06T 2207/30101* (2013.01); *G06T 2207/30242* (2013.01); *G06V 2201/031* (2022.01)

(56) References Cited

U.S. PATENT DOCUMENTS

| | | | |
|---|---|---|---|
| 2006/0188140 A1 | 8/2006 | Gholap et al. | |
| 2006/0241495 A1* | 10/2006 | Kurtz | A61B 5/442 600/476 |
| 2007/0263226 A1* | 11/2007 | Kurtz | G01N 21/6458 356/492 |
| 2011/0060560 A1* | 3/2011 | Longoni | G06F 30/00 703/1 |
| 2011/0282183 A1* | 11/2011 | Song | A61B 5/055 600/410 |
| 2014/0039300 A1* | 2/2014 | Gjesdal | G01R 33/5608 600/420 |
| 2015/0356730 A1* | 12/2015 | Grove | G06T 7/64 382/124 |
| 2019/0043198 A1* | 2/2019 | Ward | G06T 7/11 |
| 2019/0150822 A1* | 5/2019 | Wang | A61B 5/4064 |
| 2020/0032265 A1 | 1/2020 | Hornung et al. | |

OTHER PUBLICATIONS

Gilhodes, et al., "Quantification of Pulmonary Fibrosis in a Bleomycin Mouse Model Using Automated Histological Image Analysis", PLOS One, Jan. 2017, pp. 1-14.

Suzuki, et al., "Topological Structural Analysis of Digitized Binary Images by Border Following", Computer Vision, Graphics, and Image Processing, 1985, pp. 32-46, vol. 30.

* cited by examiner

SYSTEM AND METHOD FOR ESTIMATING A QUANTITY OF INTEREST BASED ON AN IMAGE OF A HISTOLOGICAL SECTION

BACKGROUND

The invention relates to a system and a method for estimating a quantity of interest related to the density of a tissue from a human or animal organ based on a histological image, and thus providing objective and reproducible assistance to healthcare personnel so that they may establish a diagnosis with regard to a potential human or animal pathology, or even assistance in estimating the curative relevance of a treatment with regard to such a pathology by a laboratory investigator.

Biological imaging is currently one of the major resources for exploring organs and different organic tissues. It notably leads in the fields of assisting medical diagnostics as well as preclinical and clinical research.

Different techniques are currently being used in preclinical and clinical imaging, such as magnetic resonance imaging, optical, electron and confocal microscopy, microtomography, ultrasound and scanners. These techniques may be used for in vivo or ex vivo observations. Digital images thus obtained allow, within the context of institutional or industrial research laboratories, a biological state of organic tissues to be more precisely analyzed and certain beneficial and/or toxic effects of certain substances to be evaluated for selection in the development of future medications.

In the digital era, the development of these digital imaging technologies has provided new prospects for histological analysis as a whole.

The possibility of accessing digital images of histological sections has allowed new methods to be developed based on the descriptive and quantitative analysis of digital images of said histological sections with computer tools using algorithms or innovative methods allowing advances in terms of precision, reliability, speed and reproducibility.

However, the use of the currently available computer tools does not allow the quantitative evaluation of certain pathologies to be automated, e.g. respiratory tract infections. In fact, the investigator still remains too involved in the process of performing this evaluation. Such manual and personal involvement leads to great variability in the characterization of the components of the samples of histological slides assessed.

Within the scope of diagnosing certain pathologies affecting the respiratory tract, e.g. IPF or idiopathic pulmonary fibrosis, evaluation by scoring samples on a histological slide, also known as Ashcroft scoring, currently remains the most used technique. It provides an evaluation of the severity of said pathologies affecting the respiratory tract.

The imaging techniques currently in use primarily depend on optical and electron microscopy. This evaluation is performed by an investigator and notably comprises the following steps:
- the sample removal from the tissues to be analyzed;
- the macroscopic analysis of said sample;
- the storage of the sample using different techniques, e.g. in formalin, embedding it in a block of paraffin wax or even freezing it at a low temperature;
- the mounting of the sample to be analyzed on a histological slide;
- the histological analysis of the sample under a microscope.

The last step of this evaluation represents a crucial phase in the anatomopathological analysis. The investigator must visually examine a sample with the utmost attention to detail and provide a descriptive analysis of a pathology. Based on this descriptive analysis, a qualitative analysis is then produced by scoring, the objective of which is to estimate the severity of the previously identified pathology, as described notably in the article T. Ashcroft, J. M. Simpson, V. Timbrell; "Simple method of estimating severity of pulmonary fibrosis on a numerical scale"; J Clin Pathol. 1988 April; 41(4): 467-470.

Though currently still widely used, quantitative analysis by scoring presents many disadvantages. In particular, it is relatively time consuming, as several hours are generally necessary to find a result, it is hard to reproduce, and it is dependent on the investigator's eye. Quantitative analysis by scoring thus requires additional analysis by an expert pathologist to corroborate or contradict the initial results. Such an additional analysis is generally performed based on observation fields of a histological slide only including a restricted part of the pulmonary section analyzed and not the entire lung section, which, given the heterogeneity of the distribution of fibrosis in general, leads to significant variation in the establishment of a diagnosis. The involvement of multiple investigators also leads to further significant variability in establishing said diagnosis and thus delays in establishing a diagnosis, for example.

To assist with the diagnostics in a concomitant way, it is possible to quantify the peribronchial and pulmonary collagen. To this end, there are hydroxyproline assay kits allowing this collagen quantification. Such kits are generally used by laboratories. They are relatively quick, since only one hour is generally necessary, and sensitive, since such kits enable the detection of collagen by dosing the hydroxyproline in the tissues and protein lysates and allowing quantifiable colorimetric results to be generated.

This method of quantification, though relatively efficacious, presents a number of disadvantages. It obligates the investigator to perform an additional test independently of the histological slide analysis, increasing the time until a diagnosis is established. In addition to the loss of time, it is possible that said quantification method may not provide any results. In fact, some pathologies affecting the respiratory tract lead to remodeling of some parts of the respiratory tract, such as the bronchioles. It may then be difficult under these conditions to quantify the collagen using known protein dosage methods.

SUMMARY

The invention provides valuable assistance to any investigator who wishes to estimate quantities of interest in establishing a diagnosis related to human or animal pathology, even in estimating the relevance of a treatment given for said pathology. The invention thus allows for a response to some or all of the disadvantages brought about by the known solutions.

Among the numerous advantages provided by the invention, we can mention that it allows:
- the necessary analysis time to establish a diagnosis of a pathology by an investigator to be reduced, decreasing said time to less than one minute according to the calculating power of the device of electronic system using a method according to the invention;
- the precision and reliability of the measurements of the sample analyzed to be greatly increased;

the variability of results between different investigators to be eliminated, providing objective and reproducible measurements.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION

Figure 1A:
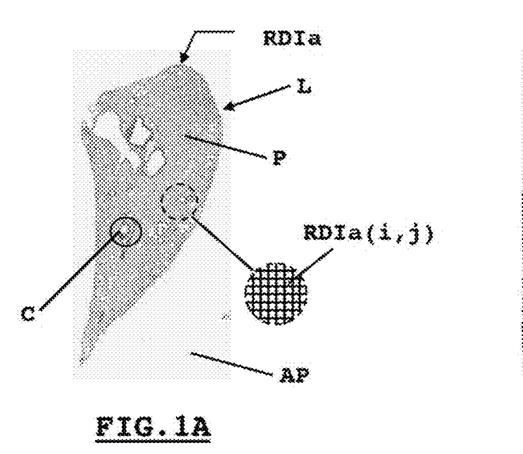
FIGS. 1A and 1B present first digital representations of a histological section of a lung from a healthy subject and of a lung from a subject with pulmonary fibrosis, respectively, the subjects in this case being rats.

FIG. 1A illustrates a first digital representation RDIa of a histological section of a lung from a healthy subject, in this case a rat. Such a first representation generally comes from a method of digitizing a histological section. A digitized histological section with a 20× enlargement provides such a first digital representation in a matrix form of approximately two hundred million pixels, in the case of the example from FIG. 1A, a representation in the form of a table of fifteen thousand rows by just as many columns, each element of said table encoding a triplet of integer values between 0 and 255, according to RGB color coding (acronym for "Red Green Blue"). Such computer coding of colors is the closest to the materials available. In general, computer screens reconstitute a color through additive synthesis based on three primary colors, one red, one green and one blue, forming on the screen a mosaic generally too small to be discerned by the human eye. RGB coding indicates a value for each of these primary colors. Such a value is generally coded into an octet and thus belongs to an interval of integer values between 0 and 255.

On the representation RDIa, the lobe of a lung L can be clearly discerned in the center of said representation. Such an organ comprises numerous distinctly tubular components C forming lumens or "holes" within said lobe according to the section taken. Such components consist primarily of vessels, bronchi, bronchioles or even alveolar sacs. The rest of the tissue P of said lobe is hereinafter referred to as "parenchyma."

Figure 1B:
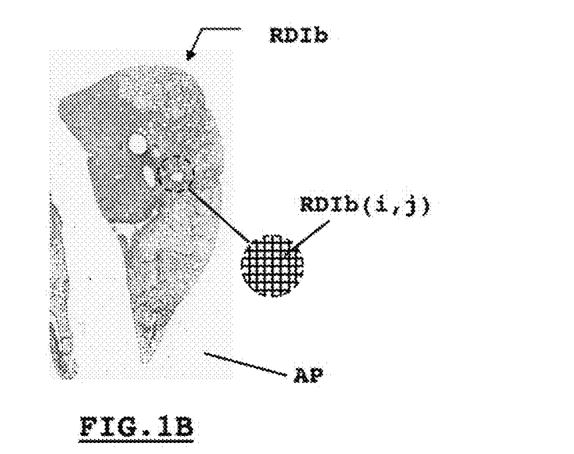

When a subject has pulmonary fibrosis, for example, the lung lesion results in the presence of excessive fibrous connective tissue, also known as scar tissue. The replacement of healthy lung tissue with such scar tissue results in an irreversible decrease in the ability to disseminate oxygen through the organ. FIG. 1B thus illustrates a first digital representation RDIb similar to the first digital representation RDIa presented in connection with FIG. 1A of a lobe of a lung of a subject with pulmonary fibrosis.

Said first digital representations RDIa and RDIb are, according to the prior art, used by investigators according to the previously described techniques, with the already mentioned disadvantages that they cause.

To produce objective, automatic and nearly real-time assistance to such investigators, the invention provides the use of a second digital representation, in the form of a table comprising the same number of elements or pixels as the first digital representation RDI of a histological section from which it is derived, such as the previously mentioned first digital representation RDIa or RDIb. Such a second digital MRI representation is said to be binary, for each of its elements MRI(i,j), indicated by two indices i and j determining the row and column, respectively, of said element or pixel in the MRI table, comprises an integer value chosen from among two predetermined values meaning, respectively, that the pixel RDI(i,j), i.e., of the same column j and the same row i in a first digital representation RDI, is or is not a pixel of interest.

Figure 2A:
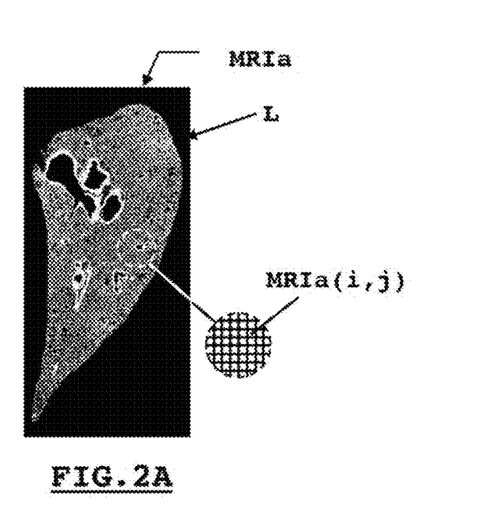
FIGS. 2A and 2B illustrate second digital binary representations, respectively, from those presented by FIGS. 1A and 1B, said second digital binary representations showcasing pixels of interest compared to others.
Figure 2B:
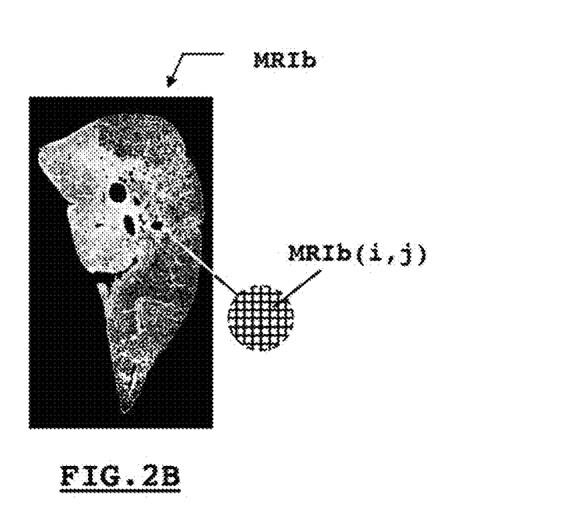

By way of example, FIGS. 2A and 2B illustrate two examples of second binary MRI representations, in this case the two binary digital representations MRIa and MRIb respectively from the first digital representations RDIa and RDIb described in connection with FIGS. 1A and 1B. According to these examples, an element MRIa(i,j) or MRIb(i,j) from the table MRIa or MRIb assumes the value 0 if the associated pixel (i.e., designated with the line i and the column j) RDIa(i,j) or RDIb(i,j) in the first digital representation RDIa or RDIb, is not a pixel of interest. Such an element MRIa(i,j) or MRIb(i,j) assumes the value 255, on the other hand, in the opposite case. In this case, such a second digital binary representation MRI may be displayed in black and white on a computer screen. Other predetermined values could have been chosen instead of 0 and 255 to characterize the absence of interest or the interest of such a pixel.

According to the provided example preferred to the analysis of a pulmonary lobe, such a pixel will be considered to be of interest when it corresponds to the parenchyma of the lobe examined. However, it will lack any particular interest when said pixel describes the exterior of said lobe or if it describes a tubular component other than an alveolar sac. Thus, any pixel describing the lumen or the structure of a bronchus, a bronchiole, even a vessel will be associated with an element MRI(i,j) having the value 0. FIGS. 2A and 2B thus describe the parenchyma in white, while the exterior of the lobe, the lumen and the components like bronchi, bronchioles or vessels appear in black.

We will later describe, in connection with FIG. 6B, the steps of processing 10 to automatically obtain such a second binary MRI representation based on a first digital RDI representation.

Figure 6A:
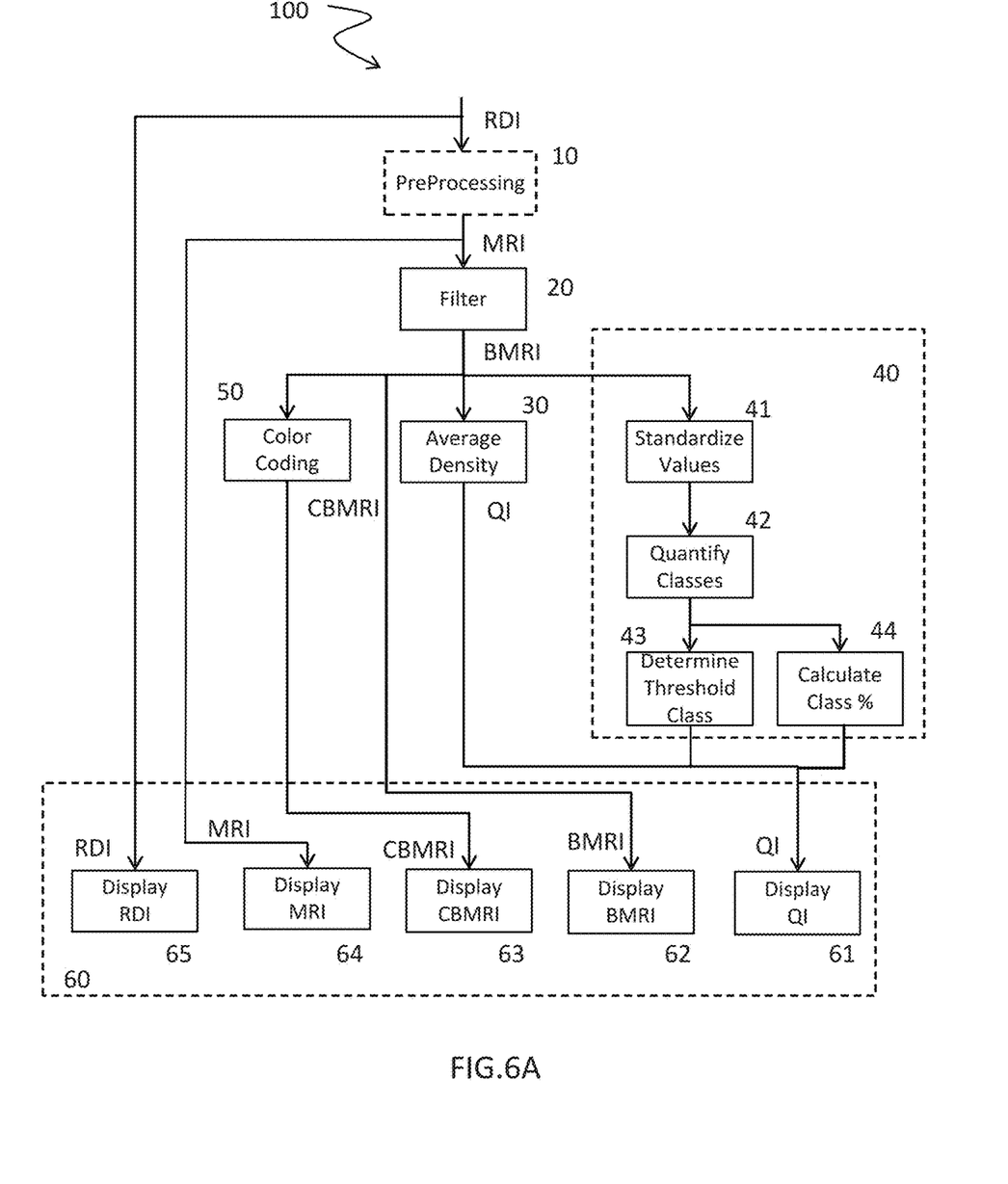
FIG. 6A presents a flow chart illustrating a non-limiting example of a method for producing an estimation of a quantity of interest relative to the density of tissue from a human or animal organ according to the invention.

FIG. 6A describes an example of a method 100 to produce an estimation of a quantity of interest QI relative to the density of a tissue of a human or animal organ, based on a digital representation of a histological section of said organ.

Such a method comprises a step 20 to apply iteratively a box blur filter, also known as a linear filter, on a second binary MRI representation such that, through successive window function operations, each pixel MRI(i,j) belonging to a single window assumes the average value of the respective values of the neighboring pixels within said window. Advantageously, such a step 20 involves creating a third digital BMRI representation of the histological section, which we can call "parenchymal density map," based on the second digital binary MRI representation. According to such a second digital binary MRI representation, each pixel within a window of a predetermined size, e.g. a window in the shape of a square with one hundred pixels on each side, said window being centered on a given pixel, assumes the average value of the associated pixels within the second binary MRI representation virtually captured by a similar window. The application of such a box filter amounts to iteratively affecting, window after window, an average value common to all the pixels of said window, expressing the portion of the elements or pixels of the second digital binary representation MRI comprising a predetermined value characterizing a pixel of interest given the total number of pixels captured by said window.

Figure 3A:
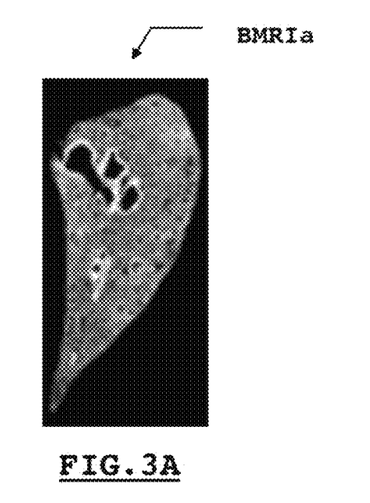
FIGS. 3A and 3B illustrate third digital grayscale representations, respectively, from those presented by FIGS. 2A and 2B, said third digital representations describing a parenchymal density of the organ analyzed, in this case a pulmonary lobe.
Figure 3B:
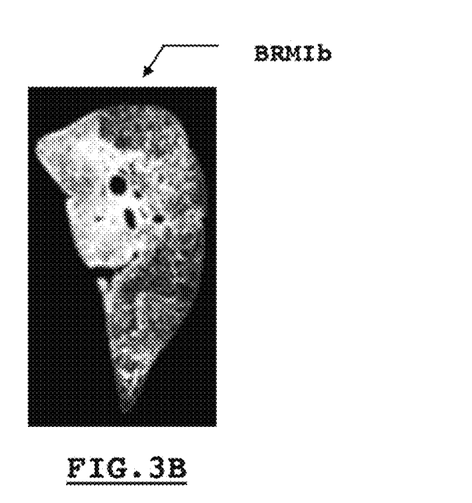

Such an average value thus expresses an average density of the parenchymal tissue within said window. In connection with the example illustrated by FIGS. 2A and 3A, we can confirm that choosing predetermined values equal to 0 and 255 to discriminate the pixels of interest from others and thus to constitute the second binary representation MRI is particularly clever. In fact, the classical application of a blur box filter produces a third digital BMRI representation in grayscale illustrating the parenchymal density. The light areas of such a third digital BMRI representation express a low parenchymal density. The distinctly gray areas or those with a medium intensity express a median parenchymal density. FIGS. 3A and 3B illustrate two examples of third digital BMRI representations produced by a method 100 according to the invention, such a method being used by an electronic object such as a computer. The third digital representation BMRIa illustrated in FIG. 3A corresponds to a healthy subject. The third digital representation BMRIb illustrated in FIG. 3B corresponds to a subject with pulmonary fibrosis. A quick visual comparison of said third digital representations BMRIa and BMRIb, produced by a method 100 according to the invention, shows a lobe with a very homogeneous parenchymal density in a healthy subject (situation represented in FIG. 3A by the image BMRIa) whereas said parenchymal density is particularly heterogeneous in a subject with pulmonary fibrosis (situation represented in FIG. 3B by the image BMRIb). Such a third digital representation BMRI can be called a "parenchymal density map."

Figure 4A:
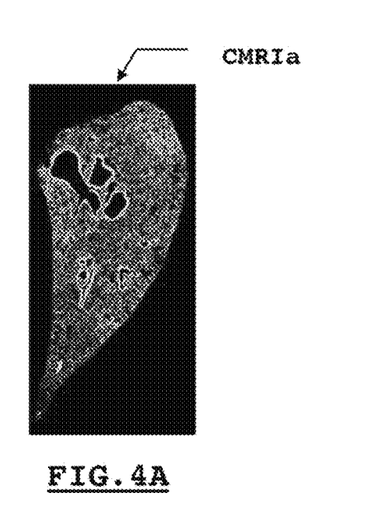
FIGS. 4A and 4B illustrate fourth digital color representations, respectively, from those presented by FIGS. 3A and 3B, said fourth digital representations describing said parenchymal density of said organ through the use of a color gradient.
Figure 4B:
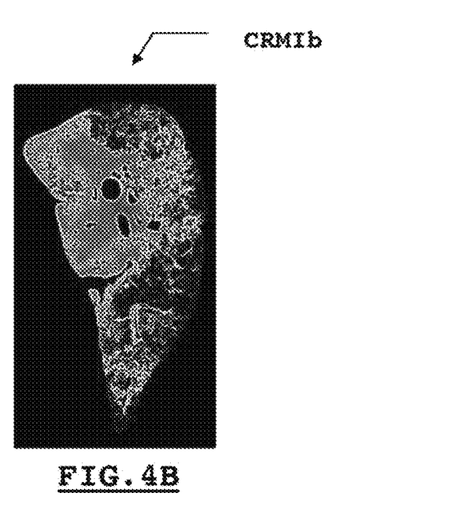

To reinforce this visual discrimination, a method 100 according to the invention may comprise a step 50 to produce a fourth digital representation CBMRI, using color coding, e.g. RGB coding, and produced based on a third BMRI representation in grayscale. A color gradient from blue to red thus allows a color fourth digital representation CBMRI to be produced, comprising numbers of lines and columns identical to those of the first digital RDI representation, according to which each element of said CBMRI representation comprises a triplet of values associated respectively with three primary colors. Thus, when such a CBMRI representation is projected or displayed on a computer screen, the low parenchymal densities appear in cold colors, e.g. blue to green, and the areas with higher parenchymal densities appear in warm colors, e.g. yellow to red. Such color coding is illustrated by FIGS. 4A and 4B presenting two examples of a fourth digital CBMRI representation generated using a method 100 according to the invention, respectively, based on a histological section of two lobes of a lung from a healthy subject, corresponding to the fourth digital representation CBMRIa, and of a subject with pulmonary fibrosis, corresponding to the fourth digital representation CBMRIb. The heterogeneity of the parenchymal density may thus be magnified through such coloring.

Beyond the production of such parenchymal density maps, in grayscale BMRI or in color CBMRI, the invention provides that a method 100 according to the invention may comprise a step 30 to produce a first quantity of interest QI allowing the investigator to elaborate a first diagnosis in the form of an average density DM obtained after standardizing the values of each pixel or element of a second digital representation MRI or a third digital BMRI representation.

In connection with the example from FIGS. 2A and 2B, according to which a second digital binary representation MRIa or MRIb only comprises elements or pixels with integer values equal to 255, i.e., if the respectively associated pixels in a first digital representation RDIa or RDIb of the histological section correspond to a parenchymal tissue, or to 0, in the opposite case. Such a calculation to produce an average density DM may involve adding the values of all the elements or pixels of the second digital binary MRI representation in question, then dividing the result by the number of elements or pixels in question. The resulting value may in turn be divided by 255 to be normalized: in fact, a density equal to 100% corresponds to a resulting luminous intensity of 255.

By way of example in a mouse, the parenchyma of a healthy subject has an average density DM of 45%. In a subject with pulmonary fibrosis, on the other hand, such an average parenchymal density DM may be greater than 70%.

As a variant or complement thereof, a method 100 according to the invention may comprise a step 40 to produce a second quantity of interest QI expressing a frequency HDFm of high parenchymal densities.

Such a step 40 may involve, in connection with FIG. 6A, quantifying, in a sub-step 42, the elements or pixels of a third representation BMRI per section with previously standardized values, i.e., each divided by 255, in a step 41. Thus, FIG. 5 describes a first line graph Ha illustrating such a quantification 42 for a healthy subject based on the third representation BMRIa described in connection with FIG. 3A. According to this example, the sub-step 42 involves counting the number of pixels per section of values among a predetermined number of classes, in this case in connection with FIG. 5, two hundred classes. We can confirm that, according to this FIG. 5, the distribution obtained roughly describes a Gaussian distribution centered on an average density of 45% (class 90), said density of the parenchymal tissue being primarily made up of 30% to 60°.

Figure 5:
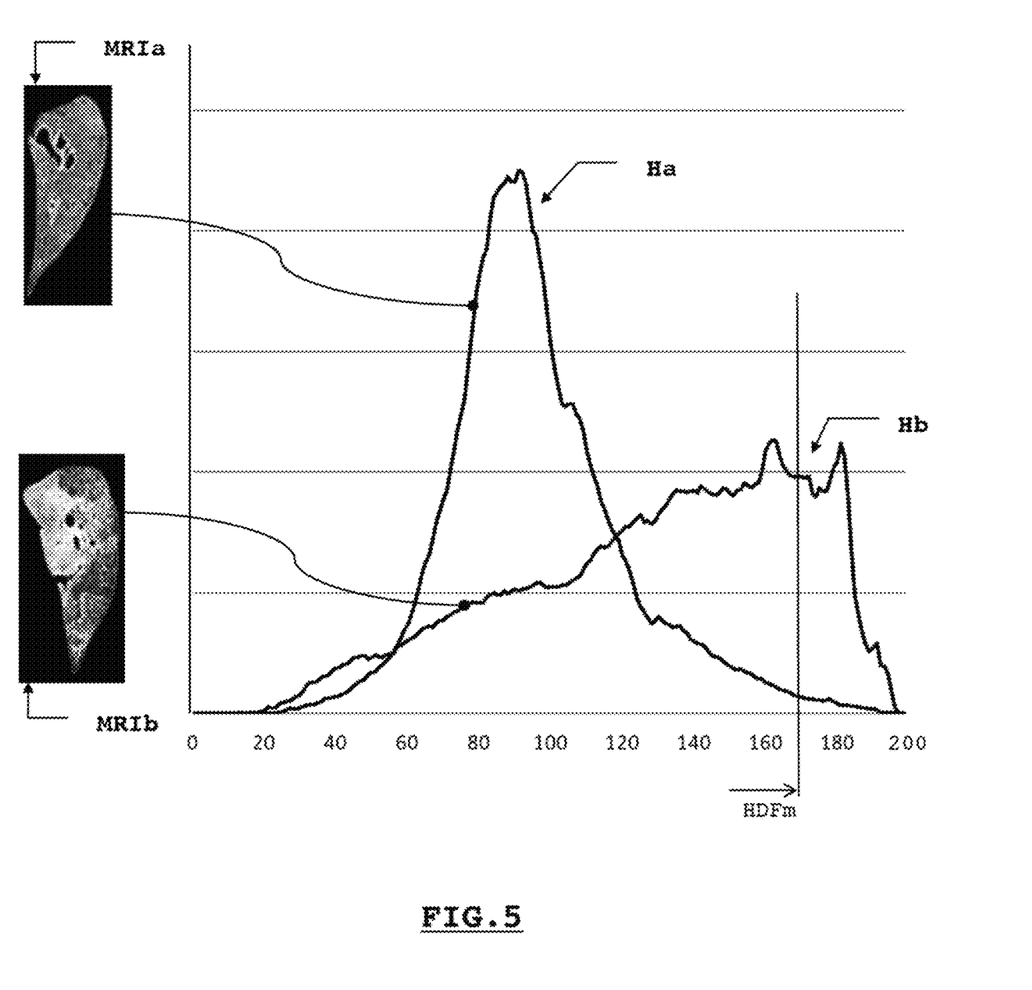
FIG. 5 illustrates two histograms of parenchymal densities, respectively, of a healthy subject and a subject with pulmonary fibrosis, allowing one or more quantities of interest to be produced in connection with the tissues examined, thus helping the investigator to formulate a diagnosis.

The invention provides to produce a second quantity of interest QI to describe the frequency of the high parenchymal densities. A predetermined threshold, e.g. the $98^{th}$ percentile of such a chart, an empirically chosen value, allows, in a sub-step 43 of step 40, the class determined by said threshold, in this case for the chart Ha the class 170, to be determined on the horizontal axis, as a quantity of interest QI. In fact, it is believed that a healthy subject comprises only very few parenchymal areas with very high densities. If the chart Hb in FIG. 5 is considered, taken from the third digital representation BMRIb, such a $98^{th}$ percentile is obtained for a much higher class, in this case the class 195, thus expressing the presence in number of highly dense parenchymal areas, potentially rich in foci. As a variant or complement thereof, the step 40 may comprise a sub-step 44 to calculate the percentile associated with a predetermined class, in this case the class 170, determining the $98^{th}$ percentile for a healthy subject. Potentially related, said quantities of interest produced provide, either to the practitioner or the investigator, precious and nearly real-time assistance in elaborating a diagnosis or measuring the relevance of processing, as mentioned above.

To this end, a method 100 according to the invention may comprise a step 61 to bring about the graphic output of the value of such a quantity of interest QI by an adapted man-machine interface, e.g. a computer screen, cooperating with the electronic object implementing said method 100. As a variant or complement thereof, such an output may be written, printed by an output device or even audio from a loudspeaker.

A method 100 according to the invention may, as a complement of step 61, comprise one or more steps 62, 63, 64, 65 to bring about a graphic reproduction via an output device identical to or different from the one providing the quantity of interest QI from step 40, respectively, of representations of the types CBMRI, BMRI, MRI and RDI. In this way, the user of method 100 has a set of objective, reproducible information assisting in the diagnosis of a pathology such as pulmonary fibrosis. All of the steps 61 to 65 thus constitute processing 60, meant to output one or more quantities of interest QI for the user, even one or more maps in this example, one or more digital representations from among the digital RDI, MRI, BMRI, CBMRI representations mentioned above.

Figure 6B:
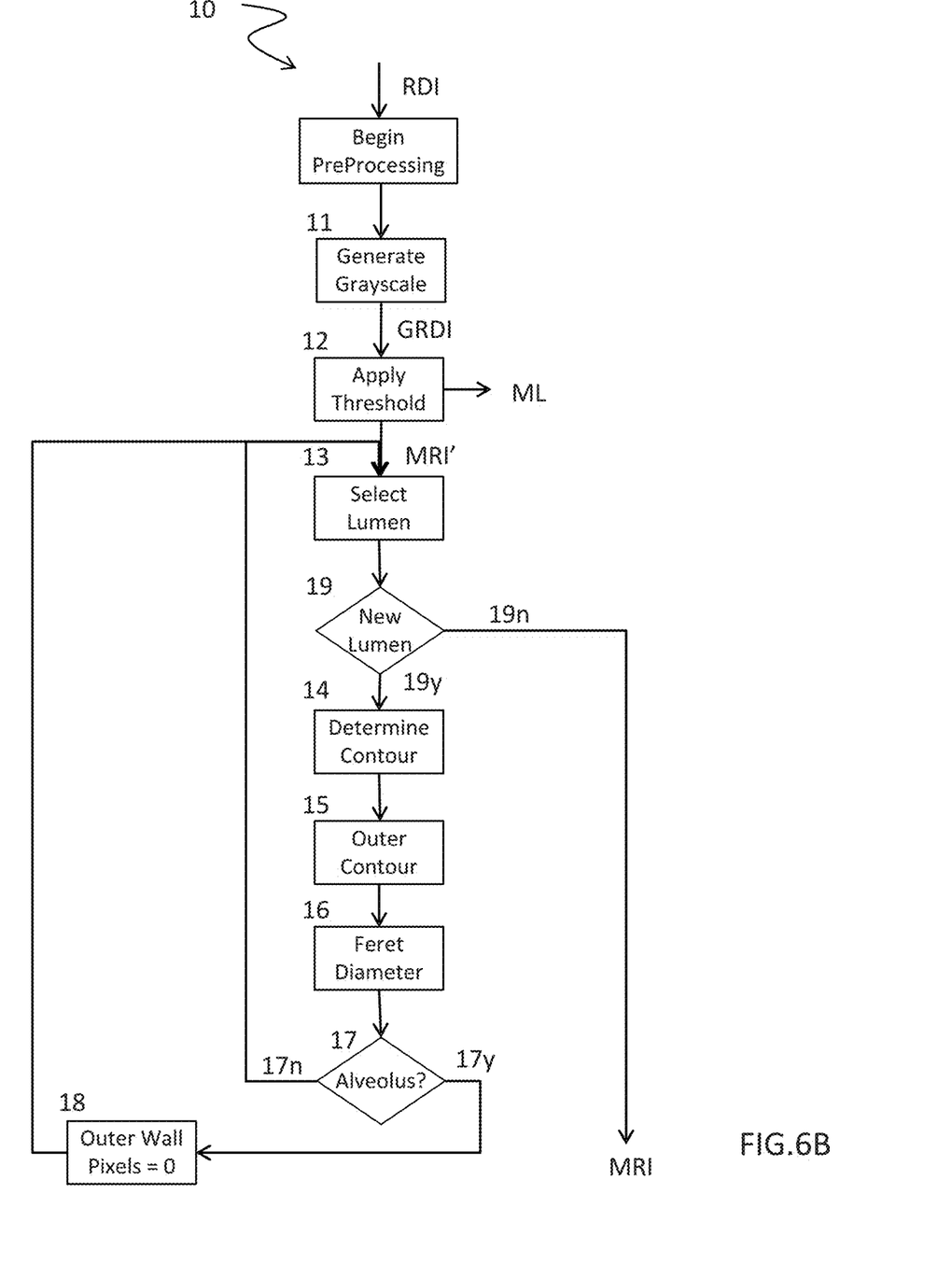
FIG. 6B more particularly presents a non-limiting example of processing used within the scope of such a method, said processing being designed to produce a binary representation characterizing pixels of interest.

FIG. 6B describes an example of processing 10 constituting a method whose execution is a prerequisite to that of method 100 described in connection with FIG. 6A. Said processing 10 may, in a variant, constitute a step prior to step 20 of said method 100 mentioned above.

Such processing 10, illustrated by FIG. 6B, is designed to automatically produce a second binary representation MRI based on a first initial representation RDI of a histological slide, e.g. the first digital representations RDIa and RDIb according to FIGS. 1A and 1B, in connection with a healthy subject or a subject with a pathology, to produce the second digital representations MRIa and MRIb according to FIGS. 2A and 2B.

Such processing 10 thus comprises a first step 11 to produce a first intermediate digital representation GRDI in grayscale, not illustrated by the figures, comprising the same number of elements or pixels as the first digital representation RDI. Such a step 11 involves using any known technique to convert, for each pixel of the representation RDI, the triplet of values representing the levels of primary colors into a integer value representing a luminosity or a luminous intensity associated with a pixel of representation GRDI thus produced. Said step 11 may moreover involve applying to the digital representation GRDI thus produced a median or bilateral filter to eliminate certain aberrations.

A step 12 of processing 10 according to the invention now involves using automatic thresholding of the pixels of the first intermediate digital representation GRDI, so as to discriminate the pixels describing all or part of a lumen formed by the cross section of a component C or the exterior of the lobe L of the lung. The pixels associated with the lumen or the exterior of the lobe assume the value 0, appearing in black in FIGS. 2A and 2B. The other pixels assume the value 255 and appear in white. They are associated with the parenchymal tissue or certain components, such as vessels, bronchi or even bronchioles. This step 12 thus produces a third digital binary representation MRI'.

Within the scope of the preferred application aiming to produce a quantity of interest QI in connection with a pulmonary pathology, it is necessary to study the density of the single parenchyma, alveoli included, i.e., the lobe, outside of all components such as the bronchi, the bronchioles or other vessels. In the mouse, the section of an alveolus describes an annular wall whose Feret diameter is less than 100 microns, unlike the other components with larger dimensions. For example, the section of a bronchus describes an annular wall whose Feret diameter is greater than 1000 microns.

Processing 10 thus comprises an iterative sequence of steps aiming to consider the pixels of the third digital representation MRI' associated with such components to know if they take on interest, i.e., describing an alveolus, or if they have no interest. In the latter case, such pixels assume the value 0. The third digital binary MRI representation is thus assumed, such as those MRIa and MRIb illustrated by FIGS. 2A and 2B, to which step 20 of the method 100 may be applied.

Said iterative sequence of the processing 10 comprises a first step 13 to seek a first lumen described by the section of a distinctly tubular component C. By applying a technique, e.g. the one described by Satochi Suzuki et al. "Topological structural analysis of digitized binary images by border following, Computer Vision, Graphics, and Image processing, 1985" or any other equivalent technique, the processing 10 comprises a step 14 to determine the contour of said lumen, corresponding to the contour of the inner wall of a component C. The result is expressed by a polyline whose indices, i.e., the rows and columns, of the pixels that constitute its characteristic points are recorded in a memory structure or table. The iterative sequence of said processing 10 now comprises a step 15 to determine the outer contour of the identified component C. Such a step 15 may, for example, constitute the use of a technique such as that known under the name "morphological dilatation of the inner contour" described in the work by Jean Serra, Image Analysis and Mathematical Morphology, 1982, or any other equivalent technique. The implementation of said step 15 thus produces a second polyline whose indices (row, column) of the pixels that constitute its characteristic points are recorded in a second structure. A subsequent step 16 involves producing the Feret diameter of said second polyline and then testing, in step 17, the value obtained compared to the predetermined maximum size of an alveolus, in this case one hundred microns, i.e., an equivalent predetermined number of pixels. If said Feret diameter is characteristic of an alveolus, a situation illustrated by the link 17n in FIG. 6B, a new iteration of the sequence of steps 13 to 17 is brought about to seek a new lumen, if such a lumen exists in the second digital binary representation MRI', a situation illustrated by a test 19 and the link 19y in FIG. 6B.

If said Feret diameter is characteristic of a component that need not be taken into consideration to evaluate in fine the parenchymal density, a situation illustrated by the link 17y in FIG. 6B, said iterative sequence comprises a subsequent step 18 involving affecting the pixels captured by the contour of the outer wall of the component of the MRI' structure, the predetermined value specifying that a pixel is not a pixel of interest, in this case, the predetermined value 0.

When there is no longer any further characteristic lumen, a situation illustrated by the test and the link 19n, the second digital binary MRI' representation is ready to be used by the step 20 of the method 100 described by way of example by FIG. 6A. Said digital representation MRI' thus modified corresponds to the anticipated second digital binary MRI representation.

The invention provides that such processing 10 may produce a fifth digital binary representation ML, which we will call "lobe mask," with the same dimensions as the second digital binary MRI representation, wherein each element comprises a first value specifying that an associated pixel within a digital RDI, MRI, BMRI or CBMRI representation belongs to the lobe or is exterior thereto. In fact, taking into consideration, notably in the second digital binary MRI representation, pixels associated with the background AP of the lobe L would alter the appearance of the quantity of interest QI produced according to the invention. For this, during the implementation of a method 100 according to the invention, a pixel of the second digital binary MRI representation will be taken into consideration if and only if the associated pixel in said lobe mask ML (i.e., with the same row and column indices) comprises a value characterizing a pixel belonging to the lobe L examined. Such an ML representation, not represented in the figures, may be produced as a complement to step 12, through the search for the largest contour through the use, for example, of a flood fill algorithm.

Figure 7:
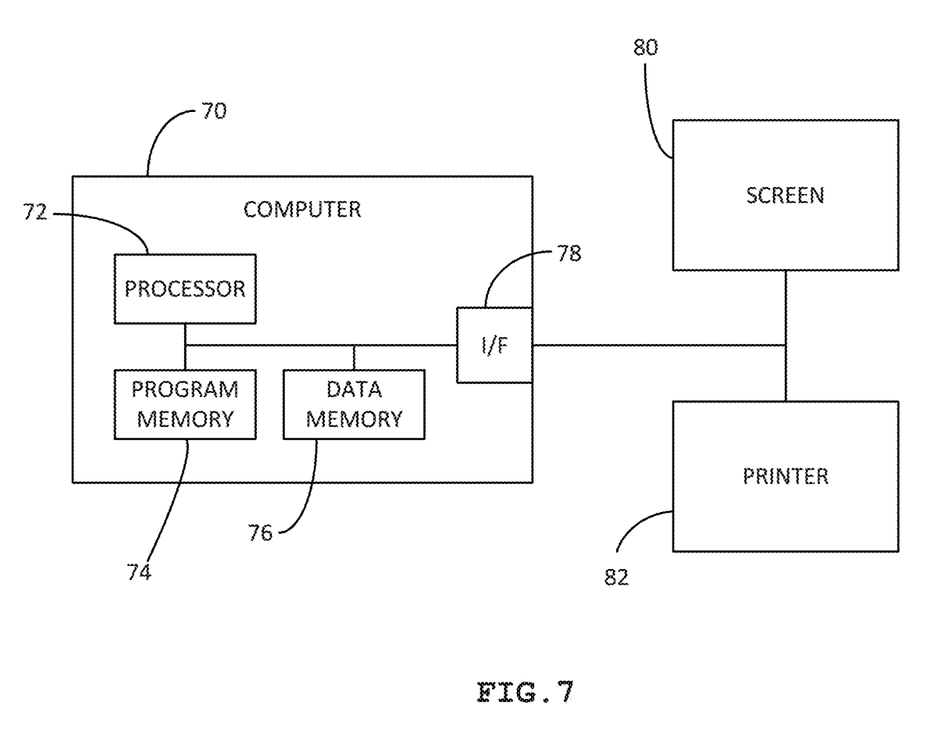
FIG. 7 is a block diagram of a system for implementing the invention.

With reference to FIG. 7, such a method 100 and such processing 10 are arranged to be transcribed into a computer program whose program instructions may be installed in a program memory 74 of an electronic object, e.g. a computer 70 with a calculation power adapted to the analysis of digital representations or images with significant sizes, considering the precision necessary for the analysis of a pulmonary lobe.

Said program instructions are thus arranged to bring about the use of said method and processing through the processing unit 72 of such an electronic object. In the sense of the present document, "processing unit" is understood as one or more microcontrollers or microprocessors cooperating with the memory 74 of programs hosting the computer program according to the invention. Such a processing unit is moreover arranged to cooperate with a memory 76 of data to host, i.e., record, the digital representations produced by implementing a method to produce a quantity of interest QI according to the invention and/or all other data necessary to use the same.

Such a processing unit is furthermore arranged to cooperate with an interface 78 to communicate with an output device, e.g. a computer screen 80, printer 82, or any other suitable device to provide the content of said quantity of interest to a human perceivably through the intermediary of one of his senses.

The invention was notably described in connection with the analysis of a pulmonary lobe of a mouse. However, it should not be limited to this single embodiment and application.

Other modifications can be foreseen within the scope of the present invention to adapt, as a variant or complement thereto, the method to produce a quantity of interest in a human or other animal, even an organ presenting anatomical similarities with the lung.

What is claimed is:

1. A method for determining a quantity of interest related to the density of organic tissue, comprising:
    obtaining a digital microscopic representation of a histological section after removal of a sample of the organic tissue;
    converting the digital representation to a binary image, to discriminate pixels that represent tissue of interest in the image;
    iteratively applying a box filter to values of the pixels of interest to obtain a tissue density value for each pixel of interest;
    calculating a number of pixels per section of values among a predetermined number of classes to express a frequency of high parenchymal densities, wherein an expression of the frequency of high parenchymal densities is a computed quantity of interest; and
    presenting a tangible representation of at least the quantity of interest.

2. The method of claim 1, further comprising:
    computing an additional quantity of interest based upon the tissue density values for the pixels of interest, wherein the additional quantity of interest comprises an average density value for tissue of interest in the image, based on the tissue density values of each of the pixels of interest.

3. The method of claim 1, further comprising:
    computing an additional quantity of interest based upon the tissue density values for the pixels of interest, wherein computing the additional quantity of interest:
    includes (i) establishing the predetermined number of classes for the tissue density values, (ii) determining the number of pixels of interest whose values fall into each class, and (iii) displaying a representation of distribution of the pixels in the classes.

4. The method of claim 3, wherein the displayed representation of the computed additional quantity of interest comprises a graph illustrating the number of pixels in each class.

5. The method of claim 1, wherein the displayed representation of the quantity of interest comprises an indication of the class that represents a predetermined percentile of the total number of pixels of interest.

6. The method of claim 1, further including the step of producing a color-coded representation of the organic tissue, wherein different colors correspond to different respective tissue density values.

7. The method of claim 1, wherein the step of converting the digital representation to a digital image comprises:
    converting the digital representation into a grayscale image;
    evaluating individual pixels of the grayscale image relative to a threshold value;
    converting the value of individual pixels whose values are less than the threshold value into one of two binary values; and
    converting the value of individual pixels whose values are greater than the threshold value into the other of the two binary values.

8. The method of claim 7, wherein the values of pixels in the grayscale image are based upon respective luminosity intensities of corresponding pixels in the digital representation.

9. The method of claim 7, further including:
    selecting a lumen of a tubular component represented in the grayscale image;
    determining the contour of the lumen;

determining the outer contour of the tubular component;
determining a Feret diameter of the outer contour;
comparing the Feret diameter to a characteristic size of a structure of interest in the tissue;
if the Feret diameter does not correspond to the representative size of a structure of interest, changing the binary state of pixels located within the outer contour of the tubular component, to thereby indicate that they are not pixels of interest.

10. The method of claim 9, further including iteratively repeating the selecting, determining, comparing and changing steps for successive lumens in the grayscale image.

11. A system for indicating a quantity of interest related to the density of organic tissue, comprising:
a processor;
a memory storing program instructions which, when executed by the processor, implements steps of:
obtaining a digital microscopic representation of a histological section after removal of a sample of the organic tissue,
converting the digital representation to a binary image, to discriminate pixels that represent tissue of interest in the image,
iteratively applying a box filter to values of the pixels of interest to obtain a tissue density value for each pixel of interest, and
calculating a number of pixels per section of values among a predetermined number of classes to express a frequency of high parenchymal densities, wherein an expression of the frequency of high parenchymal densities is a computed quantity of interest; and
an output device that presents a tangible representation of at least the quantity of interest.

12. A non-transitory computer-readable medium encoded with program instructions which, when executed by a computer, cause the computer to:
obtain a digital microscopic representation of a histological section after removal of a sample of organic tissue;
convert the digital representation to a binary image, to discriminate pixels that represent tissue of interest in the image;
iteratively apply a box filter to values of the pixels of interest to obtain a tissue density value for each pixel of interest;
calculate a number of pixels per section of values among a predetermined number of classes to express a frequency of high parenchymal densities, wherein an expression of the frequency of high parenchymal densities is a computed quantity of interest; and
present a tangible representation of at least the quantity of interest.

13. The method of claim 3, wherein the displayed representation of the quantity of interest comprises an indication of the percentile of the total number of pixels of interest associated with a predetermined class.

14. The method of claim 1, further comprising:
computing an additional quantity of interest based upon the tissue density values for the pixels of interest.

15. The system of claim 11, wherein the program instructions, when executed by the processor, further implements the step of:
computing an additional quantity of interest based upon the tissue density values for the pixels of interest.

16. The non-transitory computer-readable medium of claim 12, wherein the program instructions, when executed by the computer, further cause the computer to:
compute an additional quantity of interest based upon the tissue density values for the pixels of interest.

* * * * *